Figure 1:
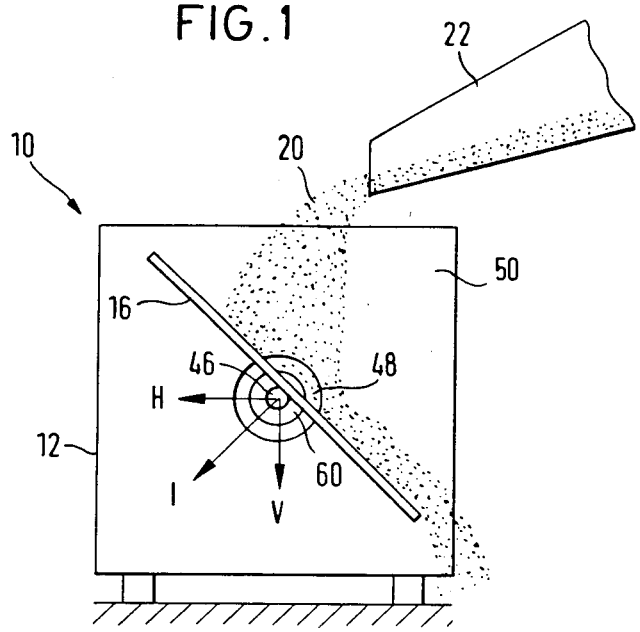

United States Patent [19]
Pfeiffer

[11] Patent Number: 4,718,284
[45] Date of Patent: Jan. 12, 1988

[54] BULK FLOW METER

[75] Inventor: Helmut Pfeiffer, Lörrach, Fed. Rep. of Germany

[73] Assignee: Endress u. Hauser GmbH u. Co., Fed. Rep. of Germany

[21] Appl. No.: 852,425

[22] Filed: Apr. 16, 1986

[30] Foreign Application Priority Data

Apr. 25, 1985 [DE] Fed. Rep. of Germany ....... 3514987

[51] Int. Cl.$^4$ .................................................. G01F 1/20
[52] U.S. Cl. ..................................... 73/861.73; 74/18.2
[58] Field of Search ........... 73/861.71, 861.72, 861.73, 73/861.74, 861.75; 277/212 F; 74/18, 18.2; 222/55, 71

[56] References Cited

U.S. PATENT DOCUMENTS

| | | | |
|---|---|---|---|
| 3,269,181 | 8/1966 | Seay | 73/861.73 |
| 3,557,616 | 1/1971 | Landon, Jr. et al. | |
| 4,506,556 | 3/1985 | Siby | 74/18.2 X |
| 4,550,619 | 11/1985 | Volk, Jr. et al. | 73/861.73 X |

FOREIGN PATENT DOCUMENTS

| | | |
|---|---|---|
| 1178268 | 9/1964 | Fed. Rep. of Germany . |
| 2534096 | 2/1977 | Fed. Rep. of Germany . |
| 3149715 | 6/1983 | Fed. Rep. of Germany . |
| 1537785 | 1/1979 | United Kingdom . |

Primary Examiner—Herbert Goldstein
Attorney, Agent, or Firm—Barnes & Thornburg

[57] ABSTRACT

A bulk flow meter having an inclined baffle plate disposed within a conveying space in the path of a bulk material to be measured is provided. The meter includes a measuring chamber that is separated from the conveying space by a partition. The baffle plate is carried by a baffle plate support which is horizontally movable under the impact of the bulk material and which includes a rod-shaped connecting member that extends through an opening in the partition. A dust protector is provided for preventing dirt and dust from entering the measuring chamber from the conveying space. The dust protector includes a rigid tube that surrounds a portion of the length of the rod-shaped connecting member on the baffle-side of the partition. Flexible diaphragms are provided for connecting the rigid tube to the partition and to the rod-shaped connecting member.

12 Claims, 6 Drawing Figures

BULK FLOW METER

The invention relates to a bulk flow meter comprising a measuring chamber separated from the conveying space by a partition, a baffle plate disposed in the conveying space inclined in the fall path of the bulk material to be measured and a horizontally adjustable baffle plate support which comprises a rod-shaped connecting member projecting through an opening in the partition.

A bulk material flow meter of this type is known for example from DE-PS No. 3,149,715. The purpose of separating the measuring chamber from the conveying space is to protect the sensitive components of the bulk flow meter accommodated in the measuring chamber from the dirt and dust obtaining in the conveying space because these sensitive components can be greatly impaired in their function by dirt and dust and this can lead to measurement errors or even to complete failure of the device.

However, in bulk flow meters of the type mentioned at the beginning there is the problem that in the partition an opening must be provided for the passage of the rod-shaped connecting member carrying the baffle or impact plate. This opening must be large enough to permit the maximum displacement of the connecting member. Thus, there is necessarily a gap through which dirt and dust can still penetrate into the measuring chamber if no additional sealing is provided.

The sealing of the opening in the partition is problematical in particular when the adjustment of the connecting member takes place transversely of the opening as is in particular the case in bulk flow meters in which the baffle plate support is linearly displaceable by a straight-line guide mechanism and the baffle plate is disposed laterally adjacent the baffle plate support. In this case the sealing must be formed such that it permits the transverse movement of the rod-shaped connecting member without exerting thereon a resistance falsifying the measured quantity.

It has however been found in particular that the measuring accuracy of such bulk flow meters is impaired when the pressure fluctuations generated in the conveying space by the falling bulk material are transmitted to the measuring chamber. However, conventional seals which offer little resistance to the movement of the rod-shaped connecting member, such as flexible bellows, transmit pressure fluctuations practically without any attenuation.

The problem underlying the invention is to provide a bulk flow meter of the type mentioned at the beginning which has a very simple and robust dust protection means which provides complete separation of the measuring chamber from the conveying space, substantially prevents transfer of pressure fluctuations between the conveying space and the measuring chamber and permits any displacement of the baffle plate support, in particular also transversely of the axis of the opening, without appreciable resistance or return forces which could falsify the measurement result.

According to the invention this problem is solved in a bulk flow meter of the type mentioned at the beginning in that the portion of the rod-shaped connecting member projecting through the opening in the partition is surrounded over a part of its length by a rigid tube whose diameter is greater than the diameter of the rod-shaped connecting member, that the one end of the rigid tube is connected by a first flexible diaphragm in dust-tight manner to the partition and that the other end of the rigid tube is connected by a second flexible diaphragm in dust-tight manner to the rod-shaped connecting member.

In the bulk flow meter according to the invention the opening provided in the partition is completely sealed by the dust protection means consisting of the tube and the two diaphragms so that any penetration of dirt or dust from the conveying space into the measuring chamber is prevented. The two diaphragms are offset with respect to each other by the length of the tube so that they permit without appreciable resistance any movement of the rod-shaped connecting member relatively to the opening, in particular also transversely of the axis of the opening. Such a transverse movement causes only a tilting of the tube which is allowed by bending of the two diaphragms. Diaphragms are particularly suitable for performing such bendings with small force expenditure and almost unlimited frequency without their strength being impaired.

Pressure differences obtaining between the conveying space and the measuring chamber can be transmitted only via the annular diaphragm surfaces present on the one hand between the rigid tube and the partition and on the other between the rigid tube and the rod-shaped connecting member. These annular diaphragm surfaces can be kept very narrow because they need only take up the tilting movement of the rigid tube corresponding to the maximum displacement of the baffle plate support. The maximum displacement of the baffle plate support in conventional bulk flow meters of this type is only a few millimeters so that the radial width of the annular diaphragm surfaces can also be kept to the order of magnitude of a few millimeters. On the other hand, no pressure can be transferred via the surface of the rigid tube which forms by far the greater part of the area of the dust protection means subjected to the pressure difference.

Figure 2:
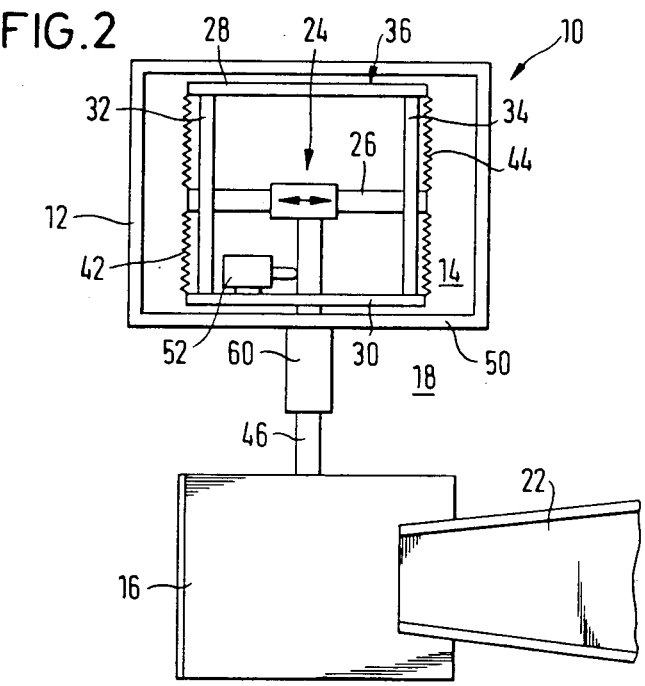
Figure 3:
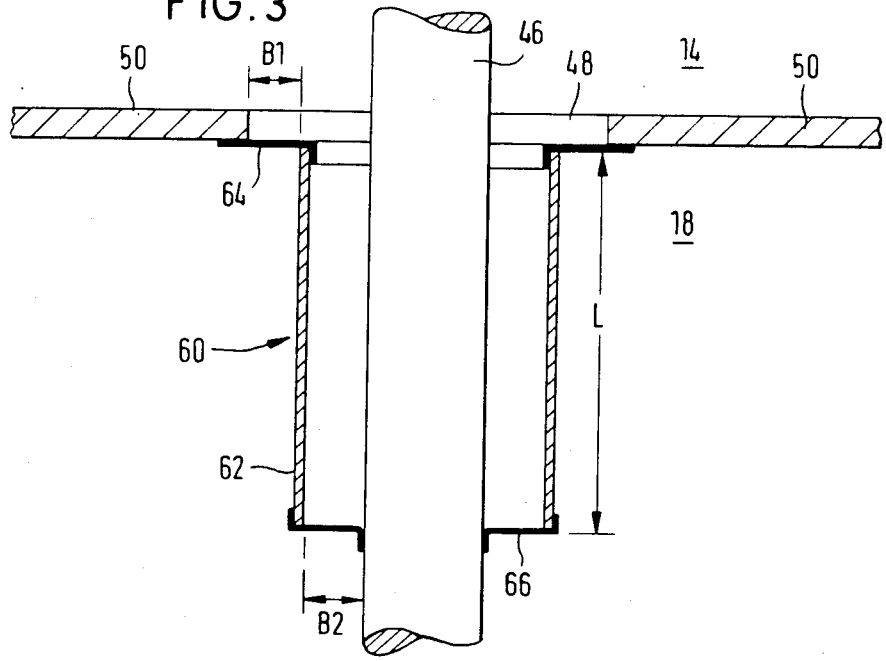
Figure 4:
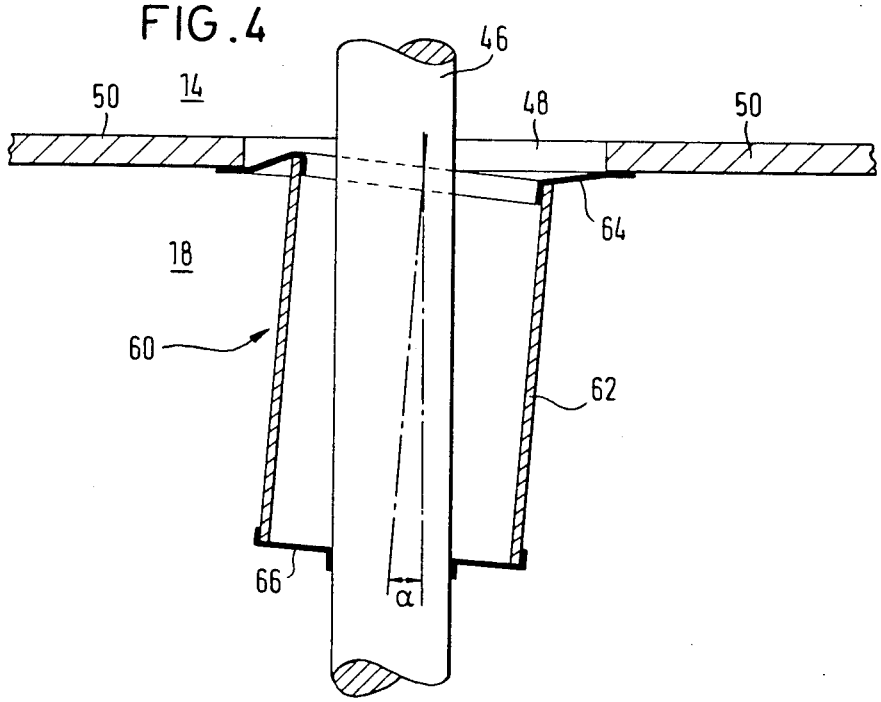
Figure 5:
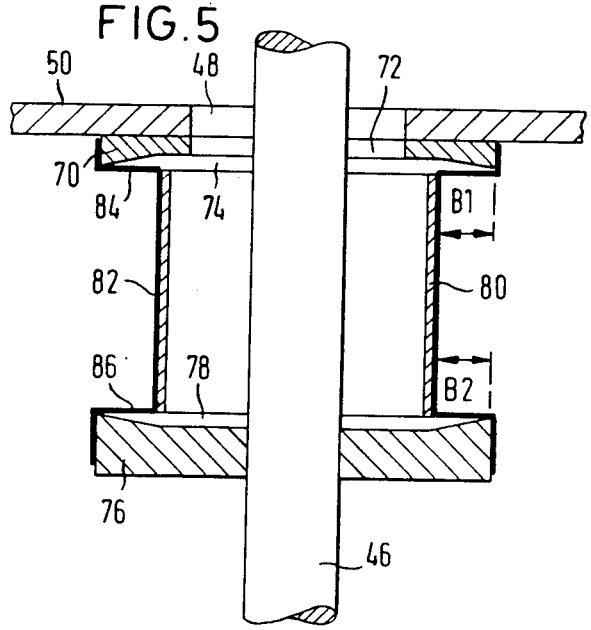
Figure 6:
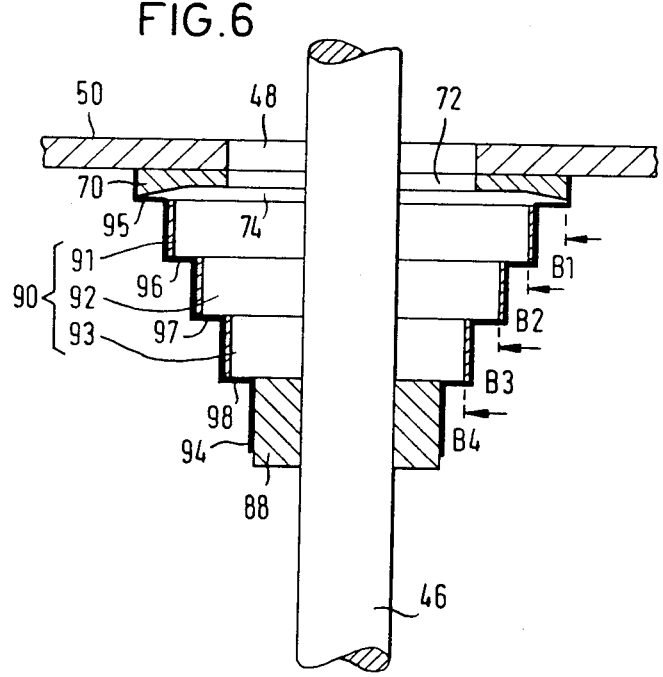

Further features and advantages of the invention will be apparent from the following description of an example of embodiment illustrated in the drawings, wherein:

FIG. 1 is a schematic side view of a bulk flow meter in which the invention can be used, FIG. 2 is a plan view of the bulk flow meter of FIG. 1 with the upper side of the housing enclosing the metering chamber removed, FIG. 3 is an enlarged illustration of a first example of embodiment of the dust protection means of the bulk flow meter of FIGS. 1 and 2 in the rest position of the impact or baffle plate, FIG. 4 is a corresponding illustration of the dust protection means of FIG. 3 at maximum displacement of the baffle plate, FIG. 5 is an enlarged illustration of a second example of embodiment of the dust protection means and FIG. 6 is an enlarged illustration of a third example of embodiment of the dust protection means.

The bulk flow meter 10 illustrated very schematically in FIGS. 1 and 2 has a housing 12 which encloses a measuring chamber 14 and an impact or baffle plate 16 which is arranged outside the housing 12 in a conveying space 18. The baffle plate 16 lies inclined in the fall path of bulk material 20, the throughput of which is to be measured and which is supplied to the conveying space 18 in any suitable manner, for example via a chute 22. The baffle plate 16 is carried by a baffle plate support 24 which is disposed in the interior of the housing 12 and which is formed so that it permits a horizontal displacement of the baffle plate 12. The baffle plate support 24 illustrated as example in FIG. 2 comprises for this purpose a beam 26 which is axially displaceably disposed in a frame 36 formed from frame-like side members 28, 30 and connecting members 32, 34. Springs 42 and 44 connecting the beam 26 to the frame 36 tend to hold the beam 26 in a defined rest position and oppose a movement of the beam 26 out of this rest position with a progressive spring force.

The baffle plate support 24 further includes a support rod 46 which extends transversely of the longitudinal axis of the beam 26 through an opening 48 in the front wall 50 of the housing 12. The support rod 46 is connected in the measuring chamber 14 rigidly to the beam 26 whilst at the end of the support rod 46 projecting outwardly into the conveying space 18 the impact or baffle plate 16 is secured. The support rod 46 thus serves as rod-shaped connecting member between the beam 26 and the baffle plate 16.

Corresponding to the known mode of operation of bulk flow meters of this type the bulk material falling onto the inclined baffle plate 16 exerts an impact force I which is directed perpendicularly to the baffle plate and which can be broken down into a horizontal component H and a vertical component V (FIG. 1). The horizontal force component H tends to move the baffle plate 16 and the baffle plate support 24 connected rigidly thereto against the force of the springs 42, 44. The magnitude of the horizontal force component or the travel caused thereby is a measure of the impact force or momentum exerted on the baffle plate which in turn with a known drop and density of the bulk material 20 is a measure of the throughput. The force or travel sensor 52 disposed in the measuring chamber 14 responds to the horizontal force component exerted or the travel caused thereby and thus furnishes an output signal which is a measure of the throughput.

The purpose of the housing 12 is to protect the measuring chamber 14 and the components of the bulk flow meter disposed therein from the dust and dirt obtaining in the conveying space 18. Settlements of bulk material, dirt and dust can cause measurement errors or lead to total failure of the device.

The sole connection between the measuring chamber 14 and the conveying space 18 is at the point of the opening 48 in the front partition 50. This opening must be large enough to permit maximum displacement of the support rod 46.

To prevent penetration of dirt and dust through the opening 48 a dust protection means 60 is provided of which various embodiments are illustrated to an enlarged scale in FIGS. 3 to 6.

Apparent in FIGS. 3 to 6 are the portion of the front wall 50 of the housing 12 surrounding the opening 48 and forming the partition between the measuring chamber 14 and the conveying space 18 and the support rod 46 passing through the opening 48.

In the embodiment illustrated in FIGS. 3 and 4 the dust protection means 60 is formed by a rigid tube 62 and two flexible diaphragms 64 and 66. The rigid tube 62 consists of metal or a rigid plastic and surrounds over a certain length the portion of the support rod 46 projecting out of the opening 48. Its diameter is greater than the diameter of the support rod 46 but less than the diameter of the opening 48. The diaphragm 64 connects the end of the tube 62 facing the opening 48 in dust-tight manner to the edge of said opening 48. The diaphragm 66 connects the other end of the tube 62 in dust-tight manner to the support rod 46. Each of the two diaphragms 64 and 66 is thus annular and dimensioned such that it completely covers the annular gap between the tube 62 and the edge of the opening 48 or the periphery of the support rod 46.

FIG. 3 shows the parts of the dust protection means 60 in the rest position of the baffle plate support 24, i.e. when no force is exerted by bulk material on the baffle plate 16. The support rod 46 is then substantially in the centre of the opening 48 and the diaphragms 64 and 66 hold the tube 62 substantially coaxially to the support rod 46.

In FIG. 4 the same parts assume the position corresponding to the maximum adjustment of the baffle plate support 24. The support rod 46 is then laterally offset with respect to the centre axis of the opening 48. The longitudinal axis of the tube 62 is tilted with respect to its rest position through an angle $\alpha$. This tilting is made possible by the flexibility of the diaphragms 64 and 66. The diaphragms exert on the support rod 46 a certain return force which opposes the measuring force and is undesirable because it falsifies the measurement result. The return force is a function of the properties of the diaphragm, in particular the diaphragm material employed, the weight of the tube and the geometrical dimensions of the entire system.

With regard to the geometrical dimensions it can be seen from FIG. 4 that the internal diameter of the tube 62 must be so dimensioned that the support rod 46 in the position of maximum displacement still does not strike the tube 62.

To obtain the minimum possible return forces the use of very flexible diaphragms is favourable but there are limits in this respect due to the requirements of adequate mechanical strength and continuous loadability. Preferably, the diaphragms consist of silicone rubber. Their edge portions may be connected to the partition 50, the tube 62 and the support rod 46 by clips.

Under otherwise identical conditions the return forces are the smaller the longer the tube 62. The tube length L can however not be made of any desired magnitude because of the space conditions obtaining. Moreover, the reduction of the return force with increasing tube length becomes progressively smaller so that from a certain tube length onwards no appreciable gain is obtained.

If there is a pressure difference between the measuring chamber 14 and the conveying space 18 on either side of the partition 50 the free annular surfaces of the diaphragms 64 and 66 are the sole surfaces of the dust protection means 60 via which the pressure difference can be transferred because a pressure transfer is not possible via the surface of the rigid tube 62. It is therefore favourable as regards the problem of pressure transfer to keep the radial widths of the free annular surfaces of the diaphragms 64 and 66, i.e. the width B1 of the diaphragm 61 and the width B2 of the diaphragm 66, as small as possible. These widths B1 and B2 also depend on the maximum displacement of the support rod 46. It is pointed out in this connection that the illustration in FIGS. 3 and 4 is not true to scale and in particular the displacement of the support rod 46 shown in FIG. 4 has been very much exaggerated for clarity. In reality it is only a few millimeters when the sensor 52 is a displacement sensor and practically zero when the sensor 42 is a force sensor. The radial widths B1 and B2 of the diaphragms 64 and 66 may therefore also be kept to the order of magnitude of a few millimeters. They are in any case very small compared with the length L of the rigid tube 62. For example, with a tube length L of about 200 mm each width B1 and B2 may be between about 5 and 15 mm.

FIG. 5 shows another example of embodiment of the dust protection means. In this case at the edge zone of the partition 50 surrounding the opening 48 an annular flange 70 is connected in dust-tight manner to the partition 50. This can be done by any known manner of connecting ensuring a dust-tight seal. The flange 70 is so arranged that its opening 72 aligns with the opening 48 of the partition 50. The end side of the flange 70 remote from the partition 50 has a plate-shaped recess 74.

A further annular flange 76 is connected in dust-tight manner to the support rod 46. The end side of the flange 76 facing the flange 70 has a plate-shaped recess 78. The two flanges 70 and 72 have about the same external diameter.

Between the two flanges 70 and 72 a rigid tube 80 surrounding the support rod 46 is disposed and the length of said tube is substantially equal to the distance between the two flanges 70 and 76. The internal diameter of the tube 80 is substantially greater than the diameter of the support rod 46 and its external diameter is less than the external diameter of each flange 70, 72.

A hose-like covering 82 of flexible material, for example silicone rubber, surrounds in tight engagement the rigid tube 80 and the outer surfaces of the two flanges 70 and 76 to which the hose-like covering 82 is connected in dust-tight manner round the periphery. The hose-like covering or envelope 82 thus forms a continuous dust-tight seal from the partition 50 up to the flange 76.

An annular portion of the covering 82 which extends substantially radially between the outer surface of the flange 79 and the rigid tube 80 and which covers the plate-shaped recess 74 of the flange 70 forms a first flexible diaphragm 84. In the same manner, an annular portion of the covering 82 extending substantially radially between the outer surface of the flange 76 and the rigid tube 80 and covering the plate-shaped recess 78 of the flange 76 forms a second flexible diaphragm 86.

It is immediately apparent that the suspension of the rigid tube 80 at the two flexible diaphragms 84 and 86 permits a transverse displacement of the support rod 46 with tilting of the rigid tube 80 in the same manner as illustrated in FIG. 4 for the first embodiment. The tilting of the rigid tube 80 is permitted by the plate-shaped recesses 72 and 78 in the flanges 70, 76.

In the embodiment of FIG. 5 the two diaphragms 84 and 86 lie at the outer side of the rigid tube 80 and at the facing end sides of the flanges 70, 76. The radial widths B1 of the diaphragm 84 and B2 of the diaphragm 86, which are of equal magnitude in the example of embodiment illustrated, should again be kept as small as possible to reduce the problem of pressure transfer, as explained above with reference to the example of embodiment of FIGS. 3 and 4.

FIG. 6 shows a third example of embodiment of the dust protection means which is formed by modifying the example of embodiment of FIG. 5. As in the latter, at the partition 50 the annular flange 70 provided with the plate-shaped recess 74 is arranged in dust-tight manner such that its opening 72 aligns with the opening 48 in the partition 50. Furthermore, a second flange 88 is again connected in dust-tight manner to the support rod 46 but in this case the external diameter of the second flange 88 is less than the external diameter of the first flange 70.

The rigid tube 90 is divided into several (three in the example illustrated) annular tube sections 91, 92, 93 of different diameters. The diameters of the tube sections decrease stepwise with increasing distance from the partition 50, the greatest diameter, i.e. the diameter of the tube section 91, being less than the diameter of the annular flange 70 and the smallest diameter, i.e. the diameter of the tube section 93, being greater than the diameter of the flange 88. The sum of the lengths of the tube sections 91, 92 and 93 is substantially equal to the distance between the flanges 70 and 88. The external surfaces of the tube sections 90, 92, 93 and the surfaces of the flanges 70 and 88 are again enclosed by a closely engaging hose-like covering or envelope 94 of flexible diaphragm material, for example silicone rubber, and the end portions of the hose-like covering 94 are connected to the outer surfaces of the flanges 70 and 88 in dust-tight manner round the periphery thereof. The annular sections of the hose-like covering 94 which extend substantially radially and which cover the intermediate spaces between the outer surfaces of the flanges and the outer tube sections 91, 93 and the intermediate spaces between the individual tube sections 91–92 and 92–93 form flexible annular diaphragms 95, 96, 97, 98 which again permit transverse displacement of the support rod 46 with tilting of the tube sections 91, 92, 93. The effective diaphragm area in this case depends on the sum of all the radial widths B1, B2, B3, B4 of the diaphragms 95, 96, 97, 98 for which once again the dimensioning rule explained above applies.

The dust protection means described is of course not limited to use in the bulk flow meter chosen only by way of example. In particular, it is independent of the construction of the baffle plate support usedand the nature dependent thereon of the movement of the rod-like connecting member passing through the opening 48. In particular, it is equally well suited to bulk flow meters in which the baffle plate support is not displaced parallel but executes a rotational movement about an axis lying in the measuring chamber.

I claim:

1. Bulk flow meter comprising a measuring chamber separated from the conveying space by a partition, a baffle plate disposed in the conveying space inclined in the fall path of the bulk material to be measured, a horizontally movable baffle plate support which comprises a rod-shaped connecting member projecting through an opening in the partition for supporting the baffle plate, rigid tube means disposed on the baffle plate side of the partition and surrounding a portion of the rod-shaped connecting member, the inner diameter of said rigid tube means being greater than the outer diameter of the rod-shaped connecting member, a first flexible diaphragm connecting one end of said rigid tube means in dust-tight manner to the partition, and a second flexible diaphragm connecting the other end of said rigid tube means in dust-tight manner to the rod-shaped connecting member.

2. Bulk flow meter according to claim 1 in which the rigid tube means is connected by the first diaphragm to the edge of the opening in the partition and the outer diameter of the rigid tube means is less than the diameter of the opening.

3. Bulk flow meter according to claim 1 in which an annular first flange surrounding the opening is connected to the partition in dust-tight manner and the rigid tube means is connected by the first diaphragm to the periphery of the first annular flange.

4. Bulk flow meter according to claim 3 in which a second flange is connected to the rod-shaped connecting member in dust-tight manner and the rigid tube means is connected by the second diaphragm to the periphery of the second flange.

5. Bulk flow meter according to claim 4 in which the outer diameter of the rigid tube means is less than the outer diameter of each flange.

6. Bulk flow meter according to claim 5 in which the two flanges are provided with plate-shaped recesses at the end surfaces facing each other.

7. Bulk flow meter according to claim 4 in which the inner diameter of the second flange is less than the inner diameter of the first flange and the outer diameter of the rigid tube means lies between the inner diameter of the first flange and the outer diameter of the second flange.

8. Bulk flow meter according to claim 1 in which the rigid tube means comprises a plurality of tube sections of different diameter and the tube sections are connected together in dust-tight manner by flexible diaphragms.

9. Bulk flow meter according to claim 1 comprising a covering a flexible diaphragm material which surrounds the outer surface of the rigid tube means, the two ends of said covering being connected in dust-tight manner to the partition and the rod-shaped connecting member, the covering having radially extending sections forming the diaphragms.

10. Bulk flow meter according to claim 1 in which the diaphragms have free annular surfaces having radial widths, with the radial widths very small compared with a total axial length of the rigid tube means.

11. Bulk flow meter according to claim 1 in which the diaphragms are formed from a material consisting essentially of silicone rubber.

12. Bulk flow meter according to claim 4 comprising a covering of flexible diaphragm material which surrounds the outer surface of the rigid tube means, the two ends of said covering being connected in dust-tight manner to the partition and the flanges disposed on the rod-shaped connecting member, the covering having radially extending sections forming the diaphragms.

* * * * *